United States Patent
Yen et al.

(10) Patent No.: US 9,934,556 B2
(45) Date of Patent: Apr. 3, 2018

(54) THREE-DIMENSIONAL IMAGE DISPLAY SYSTEM AND DISPLAY METHOD

(71) Applicant: AU Optronics Corporation, Hsin-Chu (TW)

(72) Inventors: Yi-Ting Yen, Hsin-Chu (TW); Fu-Chuan Tsai, Hsin-Chu (TW); Chia-Pu Ho, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 350 days.

(21) Appl. No.: 14/711,893

(22) Filed: May 14, 2015

(65) Prior Publication Data
US 2016/0191908 A1    Jun. 30, 2016

(30) Foreign Application Priority Data
Dec. 30, 2014   (TW) .............................. 103146335 A

(51) Int. Cl.
| | | |
|---|---|---|
| *H04N 13/04* | (2006.01) | |
| *G06T 5/00* | (2006.01) | |
| *H04N 13/00* | (2018.01) | |
| *H04N 13/02* | (2006.01) | |

(52) U.S. Cl.
CPC ......... *G06T 5/002* (2013.01); *H04N 13/0022* (2013.01); *H04N 13/026* (2013.01); *H04N 13/0282* (2013.01)

(58) Field of Classification Search
CPC ..................................................... G06T 5/002
See application file for complete search history.

(56) References Cited

U.S. PATENT DOCUMENTS

| | | |
|---|---|---|
| 2007/0024614 A1 | 2/2007 | Tam et al. |
| 2010/0316284 A1 | 12/2010 | Jeong et al. |
| 2013/0027391 A1 | 1/2013 | Lin et al. |
| 2013/0135298 A1* | 5/2013 | Isogai ............... G06T 15/205 345/419 |
| 2015/0062370 A1* | 3/2015 | Shroff ............... H04N 5/2226 348/222.1 |

FOREIGN PATENT DOCUMENTS

WO    2013188552    12/2013

OTHER PUBLICATIONS

Cheng, Chao-Chung et al., "A Novel 2D-to-3D Conversion System Using Edge Information," IEEE Transactions on Consumer 1740 Electronics, vol. 56, No. 3, Aug. 2010, pp. 1739-1745.
Zhang, Liang et al., "Stereoscopic Image Generation Based on Depth Images for 3D TV," IEEE Transactions on Broadcasting, vol. 51, No. 2, Jun. 2005, pp. 191-199.

* cited by examiner

*Primary Examiner* — Jonathan Messmore
(74) *Attorney, Agent, or Firm* — WPAT, PC

(57) ABSTRACT

A display method includes the following steps: generating a first depth map and an edge map according to a color image; determining a first depth value of a first pixel and a second depth value of a second pixel of an edge region of the first depth map according to the edge map, in which the first pixel and the second pixel are arranged in a horizontal direction; adjusting N depth values of N pixels adjacent to the edge region of the first depth map according to a zero parallax setting reference level to generate a second depth map, where N is a positive integer, and the N pixels include at least one of the first pixel and the second pixel; and generating multiple-view images according to the second depth map and the color image to display a 3D image.

20 Claims, 7 Drawing Sheets

THREE-DIMENSIONAL IMAGE DISPLAY SYSTEM AND DISPLAY METHOD

RELATED APPLICATIONS

This application claims priority to Taiwan Application Serial Number 103146335 filed Dec. 30, 2014, which is herein incorporated by reference.

BACKGROUND

Technical Field

The present disclosure relates to three-dimensional (3D) image display system. More particularly, the present disclosure relates to a 3D image display system having a smoothing operation.

Description of Related Art

Recently, applications of various 3D images have been quite popular. In order to display 3D images effectively, a variety of technologies for displaying 3D images have been continuously proposed.

In some of approaches, a color negative method is utilized to improve crosstalk phenomenon of a 3D image. However, with arrangement of the color negative, distortion or inaccuracy of color of the 3D image is caused.

SUMMARY

One aspect of the present disclosure is to provide a display method. The display method includes the steps as follows: generating a first depth map and an edge map according to a color image; determining a first depth value of a first pixel and a second depth value of a second pixel of an edge region of the first depth map according to the edge map, the first pixel and the second pixel being arranged in a horizontal direction and adjacent to each other; adjusting N depth values of N pixels adjacent to the edge region of the first depth map according to a zero parallax setting reference level to generate a second depth map, where N is a positive integer, and the N pixels includes at least one of the first pixel and the second pixel; and generating multi-view images according to the second depth map and the color image to display a three-dimensional image.

One aspect of the disclosure is to provide a three-dimensional image display system. The three-dimensional image display system includes a depth map generation unit, a smooth processing unit, a depth image based rendering unit, and a three-dimensional image rendering unit. The depth map generation unit is configured to generate a first depth map according to a color image. The smooth processing unit comprises an edge detector and a controller. The edge detector is configured to generate an edge map according to the first depth map. The controller is configured to determine a first depth value of a first pixel and a second depth value of a second pixel of an edge region of the first depth map according to the edge map, and adjust N depth values of N pixels adjacent to the edge region of the first depth map according to a zero parallax setting reference level to generate a second depth map. The first pixel and the second pixel are arranged in a horizontal direction. N is a positive integer, and the N pixels comprise at least one of the first pixel and the second pixel. The depth image based rendering unit is configured to generate multi-view images according to the second depth map and the color image. The three-dimensional image rendering unit is configured to drive a display panel to display a three-dimensional image according to the multi-view images.

In summary, the 3D image display system and display method thereof provided by the present disclosure are able to improve the crosstalk phenomenon of a 3D image, so as to enhance visual comfort of users.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
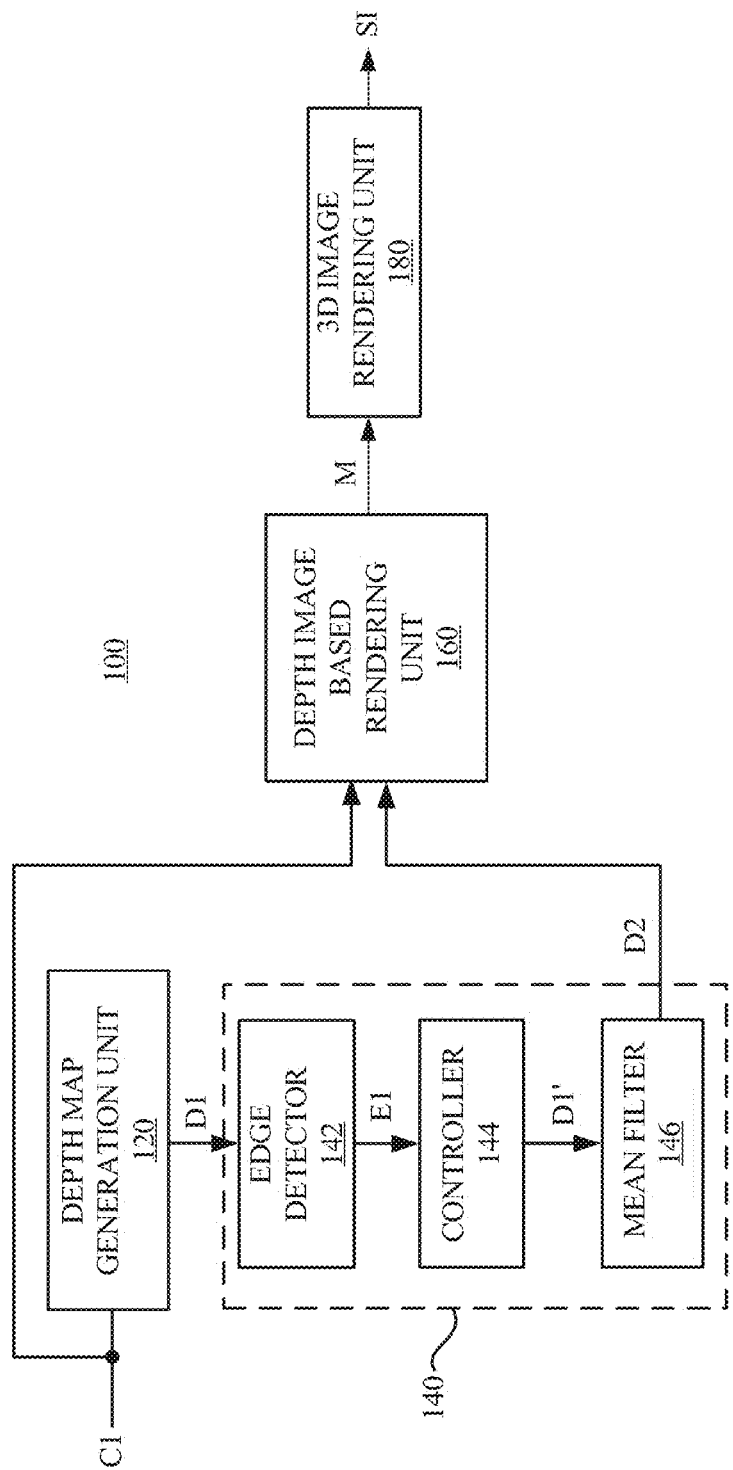
FIG. 1A depicts a schematic diagram of a 3D image display system according to one embodiment of present disclosure.

Reference will now be made in detail to the present embodiments of the disclosure, examples of which are illustrated in the accompanying drawings. Wherever possible, the same reference numbers are used in the drawings and the description to refer to the same or like parts.

Although the terms "first," "second," etc., may be used herein to describe various elements, these elements should not be limited by these terms. These terms are used to distinguish one element from another.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

In this document, the term "coupled" may also be termed as "electrically coupled", and the term "connected" may be termed as "electrically connected". "Coupled" and "connected" may also be used to indicate that two or more elements cooperate or interact with each other.

Figure 1B:
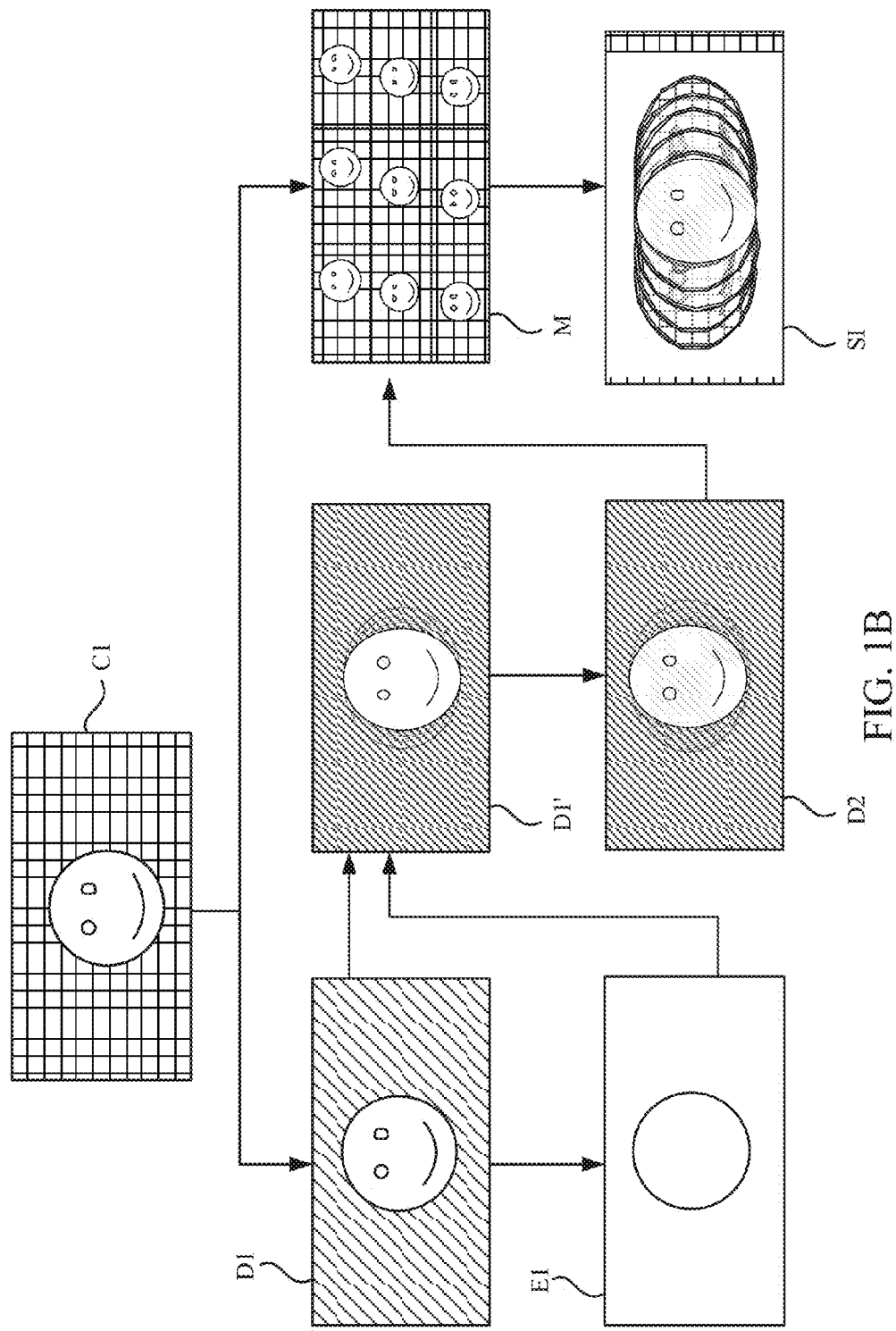
FIG. 1B depicts a schematic diagram of various images in the 3D image display system in FIG. 1A according to one embodiment of present disclosure.

Reference is now made to FIG. 1A and FIG. 1B. FIG. 1A depicts a schematic diagram of a 3D image display system according to one embodiment of present disclosure. FIG. 1B depicts a schematic diagram of various images in the 3D image display system in FIG. 1A according to one embodiment of present disclosure.

As shown in FIG. 1A, a 3D image display system 100 includes a depth map generation unit 120, a smooth processing unit 140, a depth image based rendering unit 160, and a 3D image rendering unit 180.

The depth map generation unit 120 is configured to generate a depth map D1 according to a color image C1. The smooth processing unit 140 is configured to smooth the depth map D1, so as to generate a depth map D2.

In greater detail, the smooth processing unit 140 includes an edge detector 142, a controller 144, and a mean filter 146. The edge detector 142 is configured to generate an edge map E1 according to the depth map D1. For example, the edge detector 142 is able to utilize an algorithm, such as one according to the Sober operator, the Prewitt operator, the Robert operator, the Laplacian operator, or the Log operator, to calculate a gradient change of a depth value (i.e., a gray level value) of the depth map D1, so as to generate an edge map E1. The controller 144 is configured to determine a depth value of a first pixel and a depth value of a second pixel of an edge region of the depth map D1 according to the edge map E1, and adjust depth values of pixels adjacent to the edge region of the depth map D1 according to a zero parallax setting reference level ZPS so as to generate a depth map D'. The mean filter 146 is configured to average the depth map D' as to generate the depth map D2 after the controller 144 has adjusted the depth map D1.

The depth image based rendering unit 160 is configured to generate multiple-view images M according to the depth map D2 and the color image C1. The 3D image rendering unit 180 is configured to drive a display panel so as to display a 3D image SI according to the multi-view images M.

Take the eight-bit color image C1 for example, a depth value across the depth map D2 ranges from 0 to 255, and the zero parallax setting reference level ZPS may be set to be one half of the depth range, that is 128. When the depth value of the depth map D2 is greater than the zero parallax setting reference level ZPS, a depth of field of a corresponding object in the color image C1 is shallower. On the contrary, when the depth value is less than the zero parallax setting reference level ZPS, the depth of field of the corresponding object in the color image C1 is deeper. Hence, the depth image based rendering unit 160 can calculate depth sensing values 3DSENSE according to depth values of the depth map D2 and the zero parallax setting reference level ZPS utilizing the following equation (1), and further determine displacements of the color image C1 at nine different view angles according to the plurality of depth sensing values 3DSENSE to generate the multi-view images M. The 3D image rendering unit 180 is able to drive the display panel to simultaneously output the multi-view images M, so as to output the 3D image SI.

$$3DSENSE = \frac{DepthValue - ZPS}{255} \times TX \times VIEW \quad (1)$$

Where ZPS is the zero parallax setting reference level, TX is a depth setting value which can be used for adjusting a convexity of the whole 3D image SI, and VIEW is a difference of view number. Take nine view angles for example, when the depth sensing values 3DSENSE corresponding to a fourth view angle is calculated, the difference of view number is 9−4=5. The number of the view number is given only for illustrative purposes, multi-view images having different view numbers are within the contemplated range of the present disclosure.

In various embodiments, the 3D image display system 100 smooths an edge region of an object of the depth map D1, i.e., adjusts a depth value of the edge region of the object towards the zero parallax setting reference level ZPS, so as to reduce differences between the multi-view images M, thus improving the crosstalk phenomenon of the 3D image.

In the following, several embodiments are provided to illustrate the functions and operations of the 3D image display system 100, but the present disclosure is not limited to the following embodiments.

Figure 2:
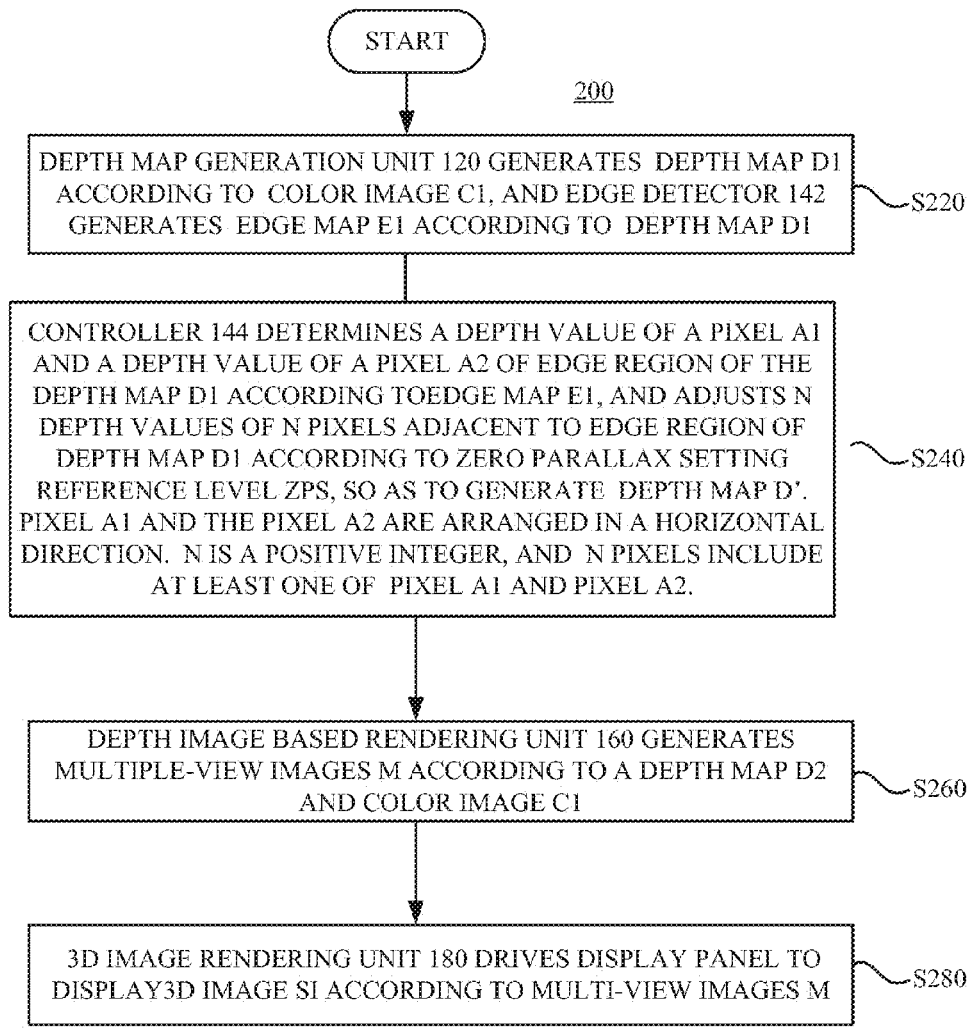
FIG. 2 depicts a flowchart of a display method according to one embodiment of present disclosure.

FIG. 2 depicts a flowchart of a display method according to one embodiment of present disclosure. A display method 200 is able to be applied to the above 3D image display system 100, but the present disclosure is not limited in this regard. For simplicity, reference is made to FIG. 1A, FIG. 1B, and FIG. 2. The operations of the 3D image display system 100 are described together with reference to the display method 200.

As shown in FIG. 2, the display method 200 includes step S220, step S240, step S260, and step S280. In step S220, the depth map generation unit 120 generates the depth map D1 according to the color image C1, and the edge detector 142 generates the edge map E1 according to the depth map D1.

In step S240, the controller 144 determines a depth value of a pixel A1 and a depth value of a pixel A2 of the edge region of the depth map D1 according to the edge map E1, and adjusts N depth values of N pixels adjacent to the edge region of the depth map D1 according to the zero parallax setting reference level ZPS, so as to generate the depth map D'. The pixel A1 and the pixel A2 are arranged in a horizontal direction. N is a positive integer, and the N pixels include at least one of the pixel A1 and the pixel A2.

In step S260, the depth image based rendering unit 160 generates multiple-view images M according to a depth map D2 and the color image C1. In step S280, the 3D image rendering unit 180 drives the display panel to display the 3D image SI according to the multi-view images M.

Figure 3A:
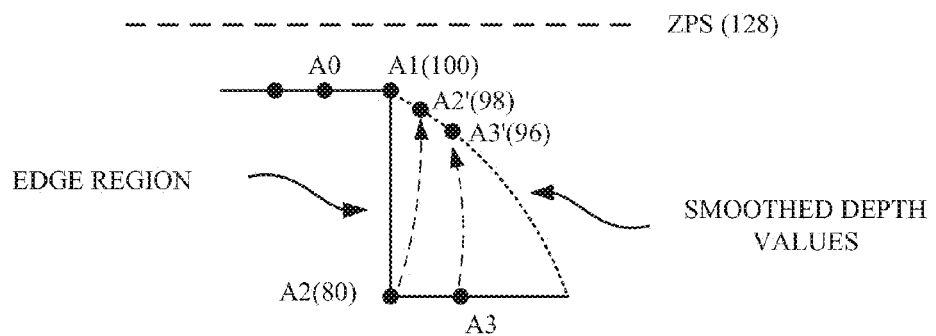
FIG. 3A depicts a schematic diagram of smoothing depth values corresponding to a pixel A1 and a pixel A2 according to one embodiment of present disclosure.

In the following, several embodiments are provided to illustrate relevant operations of the above step S240. Reference is now made to FIG. 3A. FIG. 3A depicts a schematic diagram of smoothing the depth values corresponding to the pixel A1 and the pixel A2 according to one embodiment of present disclosure.

In greater detail, in some embodiments, depth values of pixels (at least include pixels A0-A3) of the depth map D1 arranged in a same horizontal direction are 100, 100, 100, 80, 80, 80, 80, 80, 80, 80, 80, 80, 80 in sequence, as shown in FIG. 3A. The controller 144 detects that the edge region has depth values of both 100 (that is, the depth value of the pixel A1) and 80 (that is, the depth value of the pixel A2) according to the edge map E1. The controller 144 further compares the depth value of the pixel A1 (i.e., 100) and the depth value of the pixel A2 (i.e., 80) with the zero parallax setting reference level ZPS (i.e., 128). As shown in FIG. 3A, in this example, the depth value of the pixel A1 (i.e., 100) and the depth value of the pixel A2 (i.e., 80) are both less than the zero parallax setting reference level ZPS (i.e., 128), and the depth value of the pixel A1 (that is, 100) is greater than the depth value of the pixel A2 (that is, 80). Under the circumstances, the controller 144 can adjust the depth value of the pixel A2 and N−1 depth values of N−1 pixels arranged in the same horizontal direction and adjacent to the pixel A2 according to the depth value of the pixel A1 and a filtering range FS by utilizing the following equation (2).

$$G'[j+n]=G[j+n]-[(G[j+n]-G[j])/(FS)]*(FS-n) \quad (2)$$

Where n is a positive integer from 1 to N, G'[j+n] are N depth values after being adjusted, G[j] is the depth value of the pixel A1, and G[j+1] is the depth value of the pixel A2. For example, if the filtering range FS is set to be 15, the adjusted depth value G'[j+1] corresponding to the pixel A2 can be calculated by utilizing the following equation:

$$G'[j+1] = G[j+1] - [(G[j+1] - G[j])/(FS)] \times (FS - n)$$
$$= 80 - [(80 - 100)/15] \times (15 - 1)$$
$$\approx 98$$

By repeating the above operations, the controller 144 can smooth depth values corresponding to pixels adjacent to the edge region of the depth map D1. For example, the adjusted depth value G'[j+1] corresponding to the pixel A2 is 98 (which is marked as pixel A2'), and the adjusted depth value G'[j+2] corresponding to the pixel A3 is 96 (which is marked as pixel A3'). Therefore, changes of the depth values of the edge region of the depth map D1 after being adjusted become gentler. The controller 144 thus generates the depth map D1' accordingly. Effectively in this example, the controller 144 adjusts the depth value of the pixel A2 towards the zero parallax setting reference level ZPS to achieve the smoothing operation.

Figure 3B:
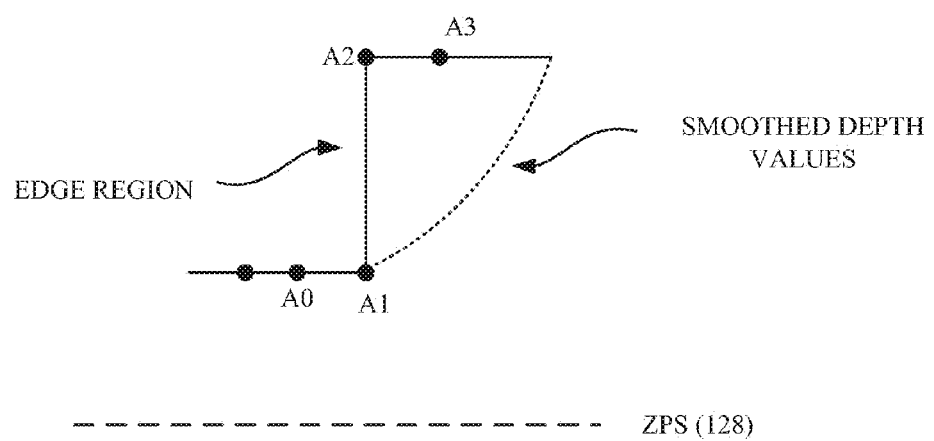
FIG. 3B depicts a schematic diagram of smoothing depth values corresponding to a pixel A1 and a pixel A2 according to one embodiment of present disclosure.

Reference is now made to FIG. 3B. FIG. 3B depicts a schematic diagram of smoothing the depth values corresponding to the pixel A1 and the pixel A2 according to one embodiment of present disclosure. Similarly, in other embodiments, when the depth value of the pixel A1 and the depth value of the pixel A2 are both greater than the zero parallax setting reference level ZPS, and the depth value of the pixel A2 is greater than the depth value of the pixel A1, the controller 144 can adjust the depth value of the pixel A2 and N−1 depth values of N−1 pixels arranged in the same horizontal direction and adjacent to the pixel A2 according to the depth value of the pixel A1 and the filtering range FS by utilizing the above equation (2) as shown in FIG. 3B. Since relevant operations are similar to those of the previous embodiment, a description is this regard is not provided.

Figure 3C:
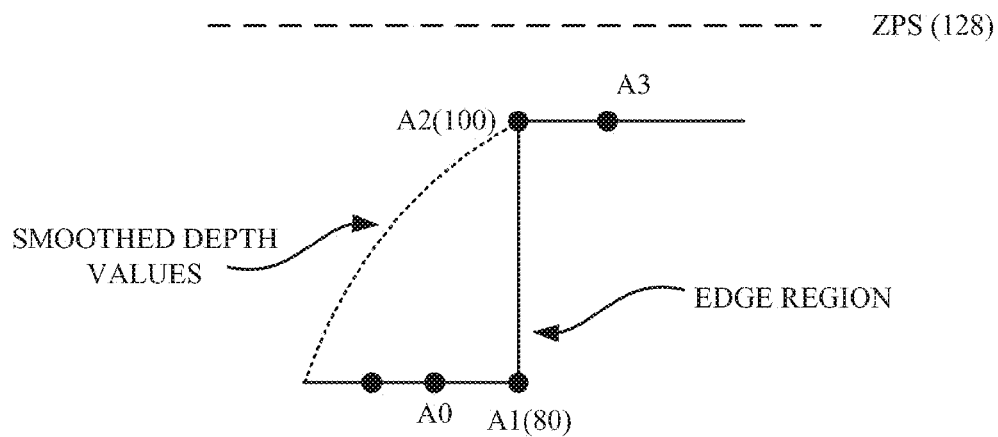
FIG. 3C depicts a schematic diagram of smoothing depth values corresponding to a pixel A1 and a pixel A2 according to one embodiment of present disclosure.

Reference is now made to FIG. 3C. FIG. 3C depicts a schematic diagram of smoothing the depth values corresponding to the pixel A1 and the pixel A2 according to one embodiment of present disclosure. In some embodiments, depth values of pixels (at least include the pixels A0-A3) of the depth map D1 arranged in a same horizontal direction are 80, 80, 80, 80, 80, 80, 80, 80, 80, 80, 100, 100, 100 in sequence. The controller 144 detects that the edge region has depth values of both 80 (that is, the depth value of the pixel A1) and 100 (i.e., the depth value of the pixel A2) according to the edge map E1. The controller 144 further compares the depth value of the pixel A1 (i.e., 80) and the depth value of the pixel A2 (i.e., 100) with the zero parallax setting reference level ZPS (i.e., 128). As shown in FIG. 3C, the depth value of the pixel A1 (i.e., 80) and the depth value of the pixel A2 (i.e., 100) are both less than the zero parallax setting reference level ZPS (i.e., 128), and the depth value of the pixel A2 (i.e., 100) is greater than the depth value of the pixel A1 (i.e., 80). In this example, the controller 144 can adjust the depth value of the pixel A1 and N−1 depth values of N−1 pixels arranged in the same horizontal direction and adjacent to the pixel A1 according to the depth value of the pixel A2 and the filtering range FS by utilizing the following equation (3).

$$G'[j-n]=G[j-n]-[(G[j-n]-G[j])/(FS)]*(FS-n) \quad (3)$$

Where G'[j−n] are N depth values after being adjusted, G[j−1] is the depth value of the pixel A1, and G[j] is the depth value of the pixel A2. For example, if the filtering range FS is set to be 15, the adjusted depth value G'[j−1] corresponding to the pixel A1 can be calculated by utilizing the following equation:

$$G'[j-1] = G[j-1] - [(G[j-1] - G[j])/(FS)] \times (FS - n)$$
$$= 80 - [(80 - 100)/15] \times (15 - 1)$$
$$\approx 98$$

Similarly, through the repetitious operations, the controller 144 can smooth depth values corresponding to pixels adjacent to the edge region of the depth map D1, so as to generate the depth map D1' accordingly. Equivalently, in this example, the controller 144 adjusts the depth value of the pixel A1 towards the zero parallax setting reference level ZPS to achieve the smoothing operation.

Figure 3D:
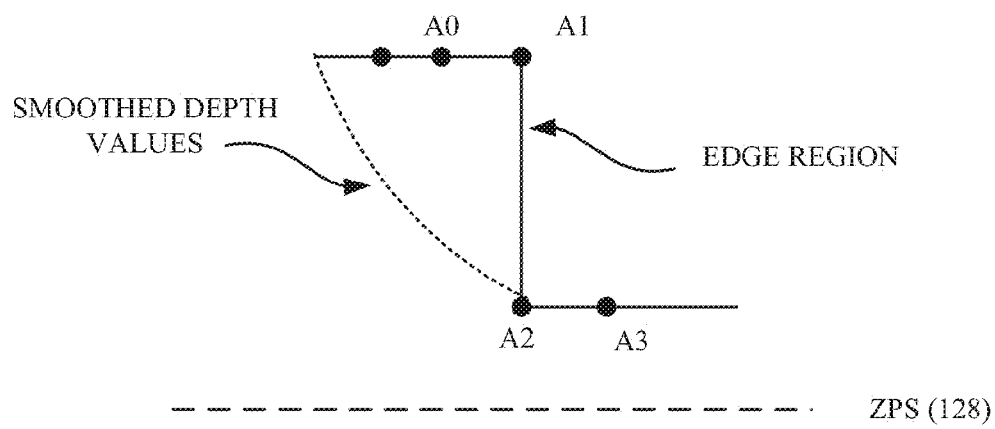
FIG. 3D depicts a schematic diagram of smoothing depth values corresponding to a pixel A1 and a pixel A2 according to one embodiment of present disclosure.

Reference is now made to FIG. 3D. FIG. 3D depicts a schematic diagram of smoothing the depth values corresponding to the pixel A1 and the pixel A2 according to one embodiment of present disclosure. Similarly, in some embodiments, when the depth value of the pixel A1 and the depth value of the pixel A2 are both greater than the zero parallax setting reference level ZPS, and the depth value of the pixel A1 is greater than the depth value of the pixel A2, the controller 144 can adjust the depth value of the pixel A1 and the N−1 depth values of N−1 pixels arranged in the same horizontal direction and adjacent to the pixel A1 according to the depth value of the pixel A2 and the filtering range FS by utilizing the above equation (3) as shown in FIG. 3D. Since relevant operations are similar with those of the previous embodiment, the repetitious descriptions are not going further on this issue.

Figure 3E:
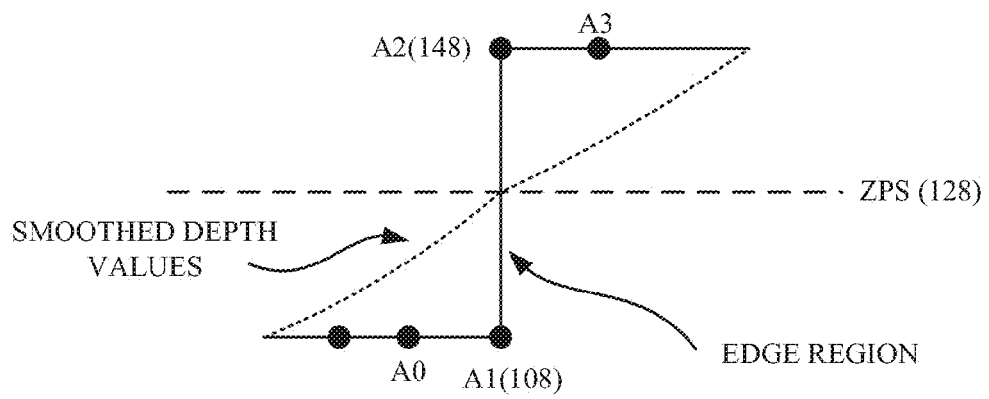
FIG. 3E depicts a schematic diagram of smoothing depth values corresponding to a pixel A1 and a pixel A2 according to one embodiment of present disclosure.

Reference is now made to FIG. 3E. FIG. 3E depicts a schematic diagram of smoothing the depth values corresponding to the pixel A1 and the pixel A2 according to one embodiment of present disclosure. In the present embodiment, the controller 144 detects that the edge region has a depth value ranging from 108 (i.e., the depth value of the pixel A1) to 148 (i.e., the depth value of the pixel A2) according to the edge map E1. In this example, the zero parallax setting reference level ZPS (i.e., 128) is between the depth value of the pixel A1 (i.e., 108) and the depth value of the pixel A2 (i.e., 148). Under the circumstances, the controller 144 can directly set the depth value of the pixel A1 to be the zero parallax setting reference level ZPS (i.e., 128), and adjust the depth value of the pixel A2 and N−1 depth values according to the depth value of the pixel A1 and the filtering range FS by utilizing the above equation (2), where the N−1 depth values corresponds to N−1 pixels arranged in the same horizontal direction and adjacent to the pixel A2. In addition, the controller 144 can further adjust M depth values corresponding to M pixels arranged in the same horizontal direction and adjacent to the pixel A1 according to the depth value of the pixel A1 and the filtering range FS by utilizing the above equation (3), where N is equal to M.

For example, an adjusted depth value G'[j+1] corresponding to the pixel A2 and an adjusted depth value G'[j−1] corresponding to a pixel A0 arranged adjacent to the pixel A1 can be obtained by the following calculations:

$$G'[j+1] = G[j+1] - [(G[j+1] - G[j])/(FS)] \times (FS - n)$$
$$= 148 - [(148 - 128)/15] \times (15 - 1)$$
$$\approx 130$$

$$G'[j-1] = G[j-1] - [(G[j-1] - G[j])/(FS)] \times (FS - n)$$
$$= 108 - [(108 - 128)/15] \times (15 - 1)$$
$$\approx 126$$

Similarly, through repetitious calculations, the controller 144 is able to smooth depth values corresponding to pixels adjacent to the edge region of the depth map D1. Effectively, in this example, the controller 144 adjusts the depth value of the pixel A1 and the depth value of the pixel A2 towards the zero parallax setting reference level ZPS at the same time, so as to achieve the smoothing operation.

Figure 3F:
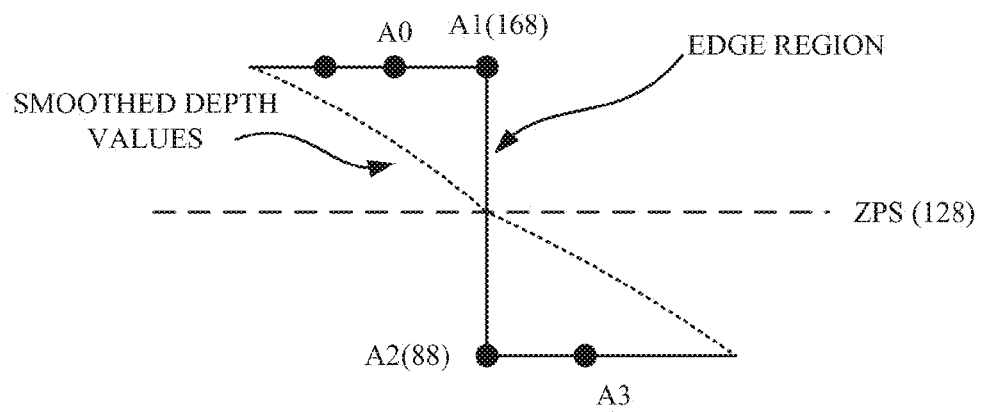
FIG. 3F depicts a schematic diagram of smoothing depth values corresponding to a pixel A1 and a pixel A2 according to still another embodiment of present disclosure.

Reference is made to FIG. 3F. FIG. 3F depicts a schematic diagram of smoothing the depth values corresponding to the pixel A1 and the pixel A2 according to still another embodiment of present disclosure. In this example, the zero parallax setting reference level ZPS (i.e., 128) is between the depth value of the pixel A1 (i.e., 168) and the depth value of the pixel A2 (that is, 88). Similarly, the controller 144 can set the depth value of the pixel A1 to be the zero parallax setting reference level ZPS, and perform operations to adjust the depth value of the pixel A2, N−1 depth values, and M depth values by utilizing the above equation (2) and (3).

For example, an adjusted depth value G'[j+1] corresponding to the pixel A2 and an adjusted depth value G'[j−1] corresponding to a pixel A0 arranged adjacent to the pixel A1 can be obtained by the following calculations:

$$G'[j+1] = G[j+1] - [(G[j+1] - G[j])/(FS)] \times (FS - n)$$
$$= 88 - [(88 - 128)/15] \times (15 - 1)$$
$$\approx 126$$

$$G'[j-1] = G[j-1] - [(G[j-1] - G[j])/(FS)] \times (FS - n)$$
$$= 168 - [(168 - 128)/15] \times (15 - 1)$$
$$\approx 132$$

By repeating calculations, the controller 144 can smooth depth values corresponding to pixels adjacent to the edge region of the depth map D1, so as to generate the depth map D1' accordingly. The mean filter 146 is able to average the depth map D' to generate the depth map D2, so as to complete subsequent operations.

Figure 4A:
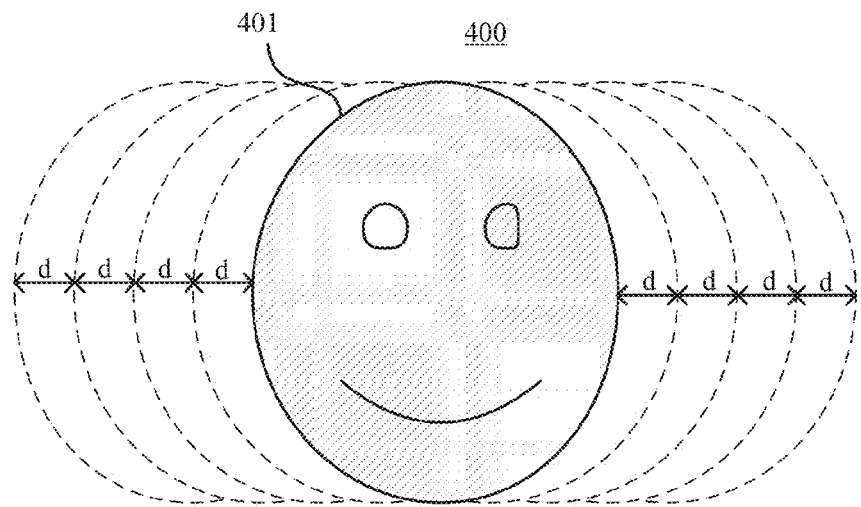
FIG. 4A depicts a schematic diagram of a 3D image plotted by relevant approaches without a smoothing operation.

Reference is now made to FIG. 4A. FIG. 4A depicts a schematic diagram of a 3D image plotted by relevant approaches without a smoothing operation.

In some of the relevant approaches, an edge region of an object is not processed by a smoothing operation. Therefore, as shown in FIG. 4A, a 3D image 400 is rendered with multi-view images M, a fixed distance d exists between edges of an object 401 of the multi-view images M. In other words, each of the multi-view images M is equally spaced from a next multi-view image by the fixed distance d, and the multi-view images M overlap simultaneously to form the 3D image 400. Hence, the crosstalk phenomenon is obviously generated on the edges of the objects 401 of the 3D image 400, which reduces visual comfort of users.

Figure 4B:
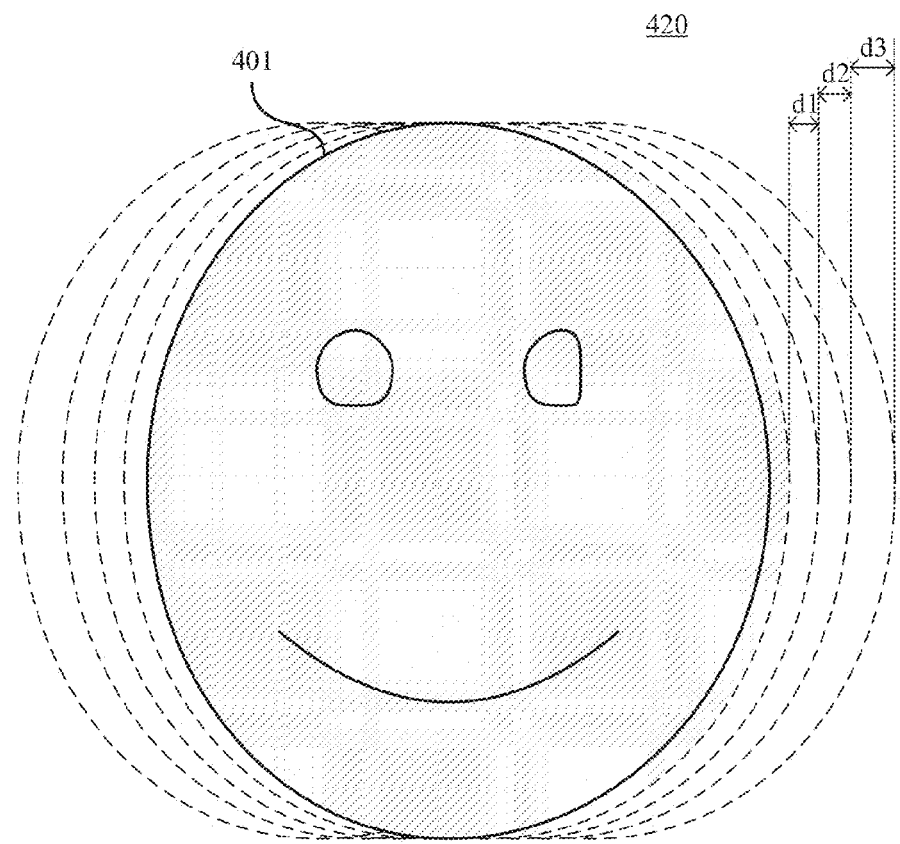
FIG. 4B depicts a schematic diagram of a 3D image plotted according to one embodiment of present disclosure.

Reference is made to FIG. 4B. FIG. 4B depicts a schematic diagram of a 3D image plotted according to one embodiment of present disclosure. As compared with FIG. 4A, the 3D image display system 100 adjusts the depth value of the pixel in the edge region of the object of the depth map D1, which has a larger difference from the zero parallax setting reference level ZPS, to achieve the smoothing operation, so as to reduce the difference of the depth value of the edge region of the object 401 between the zero parallax setting reference level ZPS. As a result, the distance existing between the edges of the objects 401 of the multi-view images M in a 3D image 420 are different, and the nearer the objects 401 are to the 3D image 420, the smaller the distance between the edges is. For example, as shown in FIG. 4B, a distance d1 is less than a distance d2, and a distance d2 is less than a distance d3. In other words, through the smoothing operation, the crosstalk phenomenon generated on the edges of the objects 401 of the 3D image 420 are obviously reduced, thus visual comforts of users are enhanced.

In various embodiments, the 3D image display system 100 is a design tool carried on a non-transitory computer-readable medium. In other words, the 3D image display system 100 is implemented in hardware, software, firmware, and the combination thereof. For illustration, if speed and accuracy are determined to be paramount, a mainly hardware and/or firmware vehicle is selected and utilized. Alternatively, if flexibility is paramount, a mainly software implementation is selected and utilized.

In summary, the 3D image display system and display method thereof provided in the present disclosure are able to improve the crosstalk phenomenon of a 3D image. so as to enhance visual comfort of users Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure In view of the foregoing, it is intended that the present disclosure cover modifications and variations of present disclosure provided they fall within the scope of the following claims and their equivalents.

What is claimed is:

1. A display method comprising:
   generating a first depth map and an edge map according to a color image;
   determining a first depth value of a first pixel and a second depth value of a second pixel of an edge region of the first depth map according to the edge map, the first pixel and the second pixel being arranged in a horizontal direction and adjacent to each other;
   adjusting N depth values of N pixels adjacent to the edge region of the first depth map according to a zero parallax setting reference level to generate a second depth map, where N is a positive integer, and the N pixels comprise at least one of the first pixel and the second pixel; and
   generating multi-view images according to the second depth map and the color image to display a three-dimensional image; wherein the step of generating the second depth map comprises:
  comparing the first depth value and the second depth value with the zero parallax setting reference level; and
  adjusting the second depth value and N−1 of the N depth values according to the first depth value and a filtering range to generate the second depth map when both the first depth value and the second depth value are less than the zero parallax setting reference level and the first depth value is greater than the second depth value or when both the first depth value and the second depth value are greater than the zero parallax setting reference level and the second depth value is greater than the first depth value;
  wherein the N−1 of the N depth values correspond to N−1 pixels arranged in the horizontal direction and adjacent to the second pixel.

2. The display method of claim 1,
  wherein N depth values after being adjusted, the first depth value, the second depth value, and the filtering range satisfy the following specific relationship:

$$G'[j+n]=G[j+n]-[(G[j+n]-G[j])/(FS)]\times(FS-n)$$

wherein n is a positive integer from 1 to N, G'[j+n] are the N depth values after being adjusted, G[j] is the first depth value, G[j+1] is the second depth value, and FS is the filtering range.

3. The display method of claim 1, wherein the step of generating the second depth map comprises:
  adjusting the first depth value and N−1 of the N depth values according to the second depth value and a filtering range to generate the second depth map when both the first depth value and the second depth value are less than the zero parallax setting reference level and the second depth value is greater than the first depth value or when both the first depth value and the second depth value are greater than the zero parallax setting reference level and the first depth value is greater than the second depth value;
  wherein the N−1 of the N depth values correspond to N−1 pixels arranged in the horizontal direction and adjacent to the first pixel.

4. The display method of claim 3, wherein N depth values after being adjusted, the first depth value, the second depth value, and the filtering range satisfy the following specific relationship:

$$G'[j-n]=G[j-n]-[(G[j-n]-G[j])/(FS)]\times(FS-n),$$

wherein n is a positive integer from 1 to N, G'[j−n] are the N depth values after being adjusted, G[j−1] is the first depth value, G[j] is the second depth value, and FS is the filtering range.

5. The display method of claim 1, wherein the step of generating the second depth map comprises:
  setting the first depth value to be the zero parallax setting reference level when one of the first depth value and the second depth value is less than the zero parallax setting reference level and another one of the first depth value and the second depth value is greater than the zero parallax setting reference level;
  adjusting the second depth value and N−1 of the N depth values according to the first depth value and a filtering range, wherein the N−1 of the N depth values correspond to N−1 pixels arranged in the horizontal direction and adjacent to the second pixel; and
  adjusting M depth values according to the first depth value and the filtering range to generate the second depth map, wherein the M depth values correspond to M pixels arranged in the horizontal direction and adjacent to the first pixel, and M is equal to N.

6. The display method of claim 5, wherein N depth values after being adjusted, M depth values after being adjusted, the first depth value, the second depth value, and the filtering range satisfy the following specific relationship:

$$G'[j+n]=G[j+n]-[(G[j+n]-G[j])/(FS)]\times(FS-n)$$

$$G'[j-n]=G[j-n]-[(G[j-n]-G[j])/(FS)]\times(FS-n),$$

wherein n is a positive integer from 1 to N, G'[j+n] are the N depth values after being adjusted, G'[j−n] are M depth values after being adjusted, G[j] is the first depth value, G[j+1] is the second depth value, and FS is the filtering range.

7. The display method of claim 1, wherein the step of displaying the three-dimensional image comprises:
  calculating a plurality of depth sensing values according to the second depth map and the zero parallax setting reference level; and
  generating the multi-view images according to the color image and the depth sensing values to display the three-dimensional image.

8. The display method of claim 1, wherein each of the multi-view images has an object, a first distance exists between an edge of the object of a first multi-view image of the multi-view images and an edge of the object of a second multi-view image of the multi-view images, a second distance exists between the edge of the object of the second multi-view image and an edge of the object of a third multi-view image of the multi-view images, the first distance is different from the second distance.

9. The display method of claim 1, wherein the step of generating the second depth map further comprises:
  averaging the first depth map to generate the second depth map after adjusting the N depth values.

10. A three-dimensional image display system comprising:
  a depth map generation unit configured to generate a first depth map according to a color image;
  a smooth processing unit comprising:
    an edge detector configured to generate an edge map according to the first depth map; and
    a controller configured to determine a first depth value of a first pixel and a second depth value of a second pixel of an edge region of the first depth map according to the edge map, and adjust N depth values of N pixels adjacent to the edge region of the first depth map according to a zero parallax setting reference level to generate a second depth map;
  wherein the first pixel and the second pixel are arranged in a horizontal direction, N is a positive integer, and the N pixels comprise at least one of the first pixel and the second pixel;
  a depth image based rendering unit configured to generate multi-view images according to the second depth map and the color image; and
  a three-dimensional image rendering unit configured to drive a display panel to display a three-dimensional image according to the multi-view images;
  wherein the controller is configured to compare the first depth value and the second depth value with the zero parallax setting reference level, and adjust the second depth value and N−1 of the N depth values according to the first depth value and a filtering range to generate the second depth map when both the first depth value and the second depth value are less than the zero parallax setting reference level and the first depth value is greater than the second depth value or when both the first depth value and the second depth value are greater than the zero parallax setting reference level and the second depth value is greater than the first depth value, wherein the N−1 of the N depth values correspond to N−1 pixels arranged in the horizontal direction and adjacent to the second pixel.

11. The three-dimensional image display system of claim 10, wherein N depth values after being adjusted, the first depth value, the second depth value, and the filtering range satisfy the following specific relationship:

$$G'[j+n]=G[j+n]-[(G[j+n]-G[j])/(FS)] \times (FS-n),$$

wherein n is a positive integer from 1 to N, G'[j+n] are the N depth values after being adjusted, G[j] is the first depth value, G[j+1] is the second depth value, and FS is the filtering range.

12. The three-dimensional image display system of claim 10, wherein the controller further adjusts the first depth value and N−1 of the N depth values according to the second depth value and a filtering range to generate the second depth map when both the first depth value and the second depth value are less than the zero parallax setting reference level and the second depth value is greater than the first depth value or when both the first depth value and the second depth value are greater than the zero parallax setting reference level and the first depth value is greater than the second depth value, wherein the N−1 of the N depth values correspond to N−1 pixels arranged in the horizontal direction and adjacent to the first pixel.

13. The three-dimensional image display system of claim 12, wherein N depth values after being adjusted, the first depth value, the second depth value, and the filtering range satisfy the following specific relationship when both the first depth value and the second depth value are less than the zero parallax setting reference level and the second depth value is greater than the first depth value or when both the first depth value and the second depth value are greater than the zero parallax setting reference level and the first depth value is greater than the second depth value:

$$G'[j-n]=G[j-n]-[(G[j-n]-G[j])/(FS)] \times (FS-n),$$

wherein n is a positive integer from 1 to N, G'[j−n] are the N depth values after being adjusted, G[j−1] is the first depth value, G[j] is the second depth value, and FS is the filtering range.

14. The three-dimensional image display system of claim 10, wherein the controller is further configured to set the first depth value to be the zero parallax setting reference level and adjust the second depth value, N−1 of the N depth values, and M depth values of the first depth map according to the first depth value and a filtering range when one of the first depth value and the second depth value is less than the zero parallax setting reference level and another one of the first depth value and the second depth value is greater than the zero parallax setting reference level, wherein the N−1 of the N depth values correspond to N−1 pixels arranged in the horizontal direction and adjacent to the second pixel, the M depth values correspond to M pixels arranged in the horizontal direction and adjacent to the first pixel, and M is equal to N.

15. The three-dimensional image display system of claim 14, wherein N depth values after being adjusted, M depth values after being adjusted, the first depth value, the second depth value, and the filtering range satisfy the following specific relationship:

$$G'[j+n]=G[j+n]-[(G[j+n]-G[j])/(FS)] \times (FS-n)$$

$$G'[j-n]=G[j-n]-[(G[j-n]-G[j])/(FS)] \times (FS-n),$$

wherein n is a positive integer from 1 to N, G'[j+n] are the N depth values after being adjusted, G'[j−n] are the M depth values after being adjusted, G[j] is the first depth value, G[j+1] is the second depth value, and FS is the filtering range.

16. The three-dimensional image display system of claim 10, wherein the depth image based rendering unit is configured to calculate a plurality of depth sensing values according to the second depth map and the zero parallax setting reference level, and generate the multi-view images according to the color image and the depth sensing values.

17. The three-dimensional image display system of claim 10, wherein each of the multi-view images has an object, a first distance exists between an edge of the object of a first multi-view image of the multi-view images and an edge of the object of a second multi-view image of the multi-view images, a second distance exists between the edge of the object of the second multi-view image and an edge of the object of a third multi-view image of the multi-view images, the first distance is different from the second distance.

18. The three-dimensional image display system of claim 10, wherein the smooth processing unit further comprises:
a mean filter configured to average the first depth map to generate the second depth map after the controller adjusts the N depth values of the first depth map.

19. A display method comprising:
generating a first depth map and an edge map according to a color image;
determining a first depth value of a first pixel and a second depth value of a second pixel of an edge region of the first depth map according to the edge map, the first pixel and the second pixel being arranged in a horizontal direction and adjacent to each other;
adjusting N depth values of N pixels adjacent to the edge region of the first depth map according to a zero parallax setting reference level to generate a second depth map, where N is a positive integer, and the N pixels comprise at least one of the first pixel and the second pixel; and
generating multi-view images according to the second depth map and the color image to display a three-dimensional image; wherein the step of generating the second depth map comprises:
adjusting the first depth value and N−1 of the N depth values according to the second depth value and a filtering range to generate the second depth map when both the first depth value and the second depth value are less than the zero parallax setting reference level and the second depth value is greater than the first depth value or when both the first depth value and the second depth value are greater than the zero parallax setting reference level and the first depth value is greater than the second depth value;
wherein the N−1 of the N depth values correspond to N−1 pixels arranged in the horizontal direction and adjacent to the first pixel.

20. The display method of claim 19, wherein N depth values after being adjusted, the first depth value, the second depth value, and the filtering range satisfy the following specific relationship:

$$G'[j-n]=G[j-n]-[(G[j-n]-G[j])/(FS)]\times(FS-n),$$

wherein n is a positive integer from 1 to N, G'[j−n] are the N depth values after being adjusted, G[j−1] is the first depth value, G[j] is the second depth value, and FS is the filtering range.

\* \* \* \* \*